Aug. 30, 1932.  J. A. MORRELL  1,875,101
OUTLET BOX
Filed Jan. 19, 1928
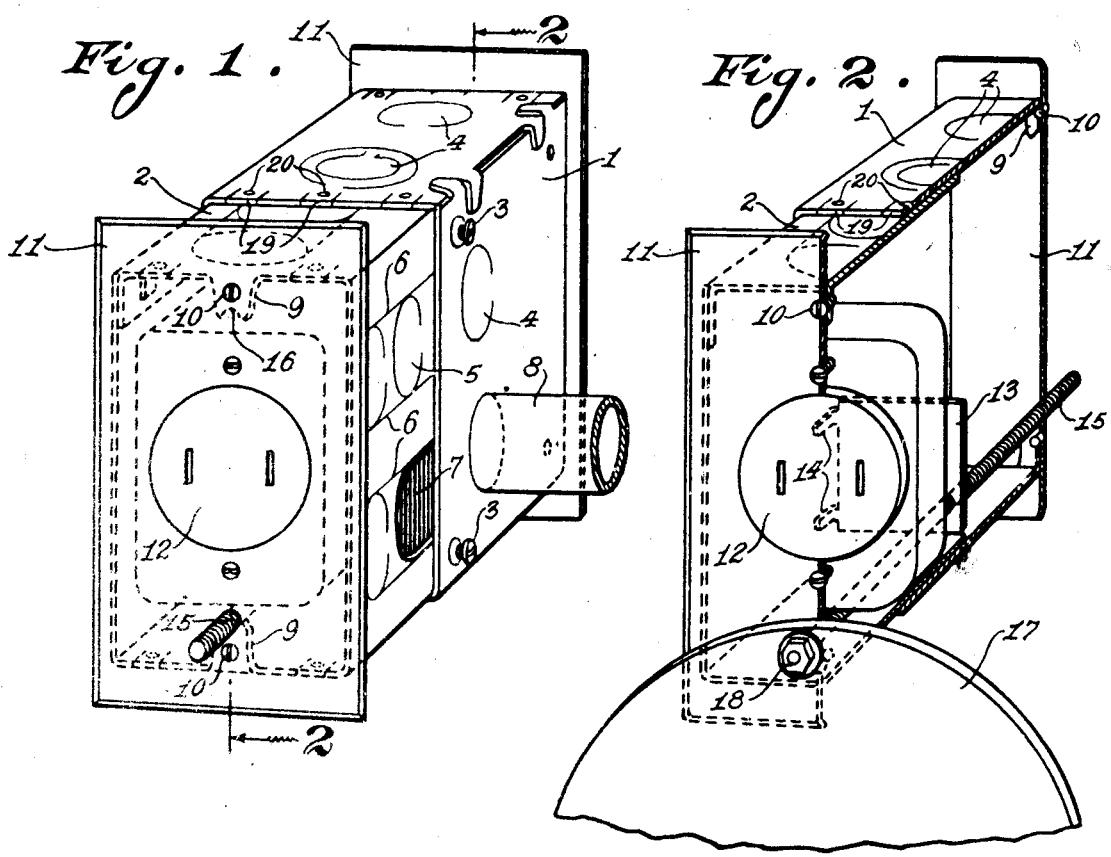
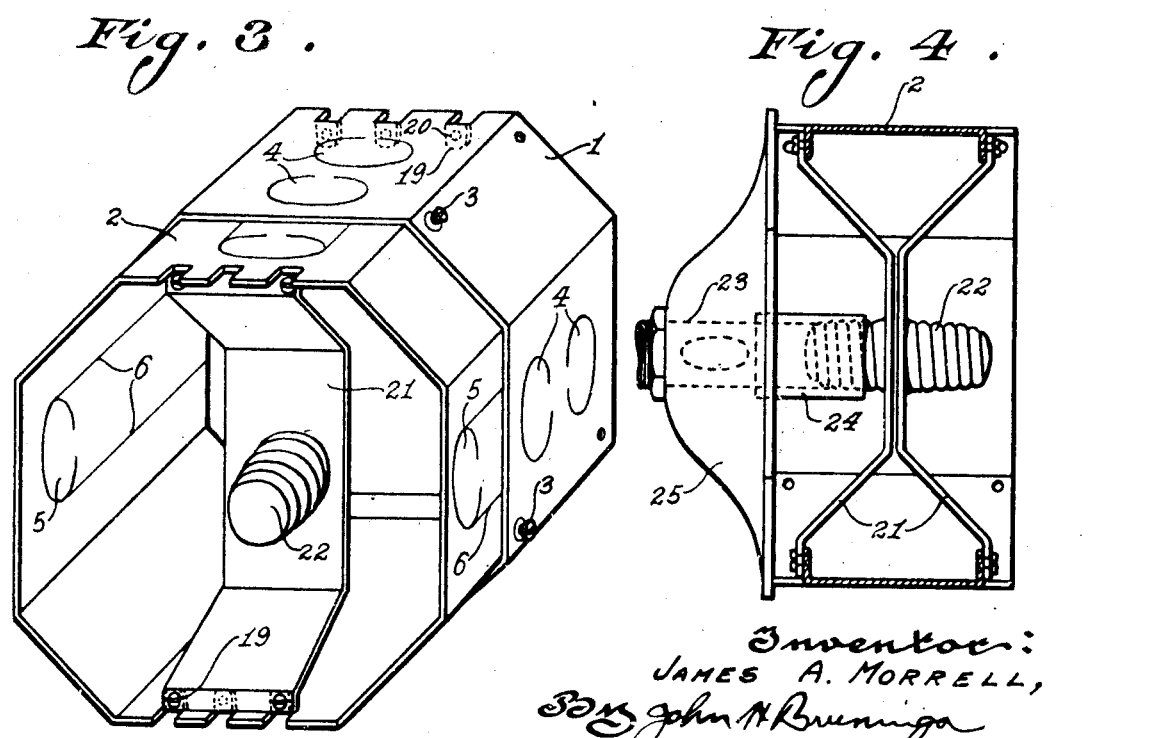
Inventor:
JAMES A. MORRELL,
By John H. Bruninga
His Attorney.

Patented Aug. 30, 1932

1,875,101

UNITED STATES PATENT OFFICE

JAMES A. MORRELL, OF ST. LOUIS, MISSOURI

OUTLET BOX

Application filed January 19, 1928. Serial No. 247,809.

This invention pertains to outlet boxes, such as are used in electric wiring of buildings for the purpose of providing wall or ceiling outlets to fixtures or attachment devices.

In the usual manner of installing electric wiring, particularly where the wires are run in metal conduit, it is customary to provide an outlet box at each point where the circuit passes out from the wall or ceiling to a fixture or similar device. These boxes are usually constructed of sheet metal or the like and are provided with knock-out elements by means of which openings may be made in the box at any convenient point, so that the metal conduit may pass thereinto. The box is closed on all sides, except the front, and the box is mounted with the open front adjacent the surface of the wall or ceiling so that access may be had to the interior thereof.

Where it is desired to install an outlet in each room on opposite sides of a partition wall, it is necessary to install two outlet boxes, one of which faces each room, and to connect both boxes in a proper manner to the metal conduit system. This manner of installation is expensive and complicates the metal conduit arrangements to a considerable extent.

One of the objects of this invention, therefore, is to provide an outlet box which may be so installed that outlets may be arranged in both of the rooms on opposite sides of a partition wall by means of the same outlet box.

Another object is to provide a construction whereby the box may be adjusted in accordance with the thickness of the partition wall so that the opposite ends thereof will be properly placed with reference to the face of the wall.

Another object is to provide such a box with means whereby the metal conduit may be let into the box at any convenient point and with the box adjusted to any desired length.

Another object is to provide a box adapted to accommodate suitable supporting members, such as are used for supporting electric fans and the like, and so that such devices may be mounted thereon in both rooms on opposite sides of a partition wall.

Another object is to provide a box suitable for arranging outlets on both sides of a partition wall and to provide means in the box for mounting wall fixtures and the like thereon.

Another object is to provide a simple construction of outlet box, which may be adjusted to fit any thickness of wall and which may, by simple manipulation, be provided with suitable supporting members and the like for mounting the box in any desired position.

Further objects will appear from the following description, taken in connection with the accompanying drawing, in which—

Figure 1 is a perspective view illustrating an outlet box embodying this invention;

Figure 2 is a similar view, partly in section, showing the arrangements for mounting a fan bracket or similar device;

Figure 3 is a perspective view illustrating another embodiment of this invention as applied to a fixture outlet; and Figure 4 is a transverse section of a box such as shown in Figure 3, but showing the use of only a single section thereof in a thin wall.

In accordance with this invention, the box is constructed of sheet metal or other suitable material and is made in two sections, 1 and 2, arranged to telescope one within the other so as to provide an extensible box, which may be adjusted in length to suit the thickness of the partition in which it is to be used. The telescopic sections are moved relatively until the length of the box has been adjusted so that the open ends thereof are properly positioned with reference to the opposite faces of the wall. When such adjustment has been obtained, the two sections are fixed relatively to one another by means of set screws 3 threaded into the outer section 1 and bearing against the inner section 2, or by means of other suitable fastenings. Knock-out elements 4, of any suitable well known type, are provided in the outer section 1. The inner section is also provided with knock-out elements 5, alined so as to register with the corresponding elements in the section 1. In this section, however, the metal may be additionally cut along lines 6, so that in case corresponding elements 5 and 4 do not register exactly, additional metal may be removed from the inner section, as illustrated at 7 in Figure 1. The metal conduit 8, by which the wires are brought to the outlet, may be passed into the box in any suitable manner through the openings thus made. The open ends of both sections may be provided with in-turned lugs 9 threaded to receive the usual screw 10, by means of which a face plate 11 may be attached to the box, so as to bear against the face of the wall.

Any suitable type of electrical fitting, such as a plug receptacle 12, may be mounted in the box in any well known manner, and suitably wired to the appropriate circuit. It will be seen that this invention provides a box by means of which outlets on opposite sides of a partition may be wired directly together and the circuit connections made to both simultaneously. It will be clear, therefore, that not only is the wiring simplified, but the conduit work is also greatly simplified, as it is necessary to install only one box, instead of two, as heretofore.

As illustrated in Figure 2, a bar or bracket 13, provided with attachment lugs 14, may be arranged for mounting within the box. In order to mount this bracket, one of the sections, 1 or 2, may be provided with suitable perforations in the side thereof so that the lugs 14 may be inserted therein and bent over to secure them, the bracket 13 being bent, if necessary, to facilitate insertion of the lugs, and thereafter straightened so as to secure the bracket in place. The bracket 13 is provided with a threaded opening adapted to receive a supporting bar 15 in the form of a screw, usually threaded throughout its length, which is arranged to extend through both boxes and to project through both face plates 11. The lugs 9 may be provided with suitable sockets 16 adapted to receive the bar 15, so as to additionally support the same at its end. The base 17 of a fan or similar device may then be hung upon the end of the supporting bar 15 and secured thereto by a suitable fastening element, such as the nut 18. In case it is required to mount fans on both sides of the partition, the same may be hung on opposite ends of the bar 15. In this case the bar will be secured in place by its engagement with the bracket 13, so that it cannot be pulled through to either side of the partition. Accordingly, if the fan on one side should be removed for any purpose, the bar 15 would be held in place and would not be liable to drop out under the weight of the other fan. In case it is desired to mount a fan on only one side of the partition, the bar 15 may be cut off just beyond the bracket 13 and secured by a suitable nut.

In order to provide extra fastening elements, either for mounting the box on its supports or for mounting suitable devices in the box, a number of tabs 19 is cut from the box material, but left in place, as is done in the case of knock-out elements. These tabs may be suitably perforated with holes 20, properly threaded or otherwise, so as to accommodate fastening screws or similar devices. These tabs are located at convenient points along the ends of the sections, so that when a fastening or mounting member is desired, one or more of these tabs may be bent outwardly or inwardly so as to provide the desired element.

Figures 3 and 4 show the invention as applied to a fixture outlet. In Figure 3, a bracket 21 provided with a fixture stud 22 may be mounted in the box in any suitable manner, as by securing the same to a pair of tabs 19. In Figure 3 the box is arranged for mounting a fixture on one side of the partition, while an ordinary outlet is provided on the other.

In Figure 4, the box is arranged for mounting fixtures on both sides of a narrow partition. When the partition is narrow enough, only one of the sections, 1 or 2, may be used, and two brackets 21 mounted back to back, as illustrated. The fixture tube 23 may then be secured to the stud 22 by a coupling 24 or other suitable device. The canopy 25 may then be properly mounted so as to cover the opening in the wall and hide the box.

It will be seen, therefore, that this invention accomplishes its objects. It provides a box which may be used to provide outlets on both sides of a partition wall and is adjustable to fit a wall of any thickness. Such a box is very useful for wiring installations in office buildings and the like, where similar outlets are regularly provided in all rooms. The arrangement lends itself in a simple manner to all kinds of outlets and particularly to the installation of fans and the like, as illustrated in Figure 2. Fixture outlets in either wall or ceiling are taken care of in a similar manner, and the outlets on opposite sides of the wall may be of the same or different nature.

In accordance with this invention, the wiring contractor needs to furnish only a single type of box. This may be used for all kinds of outlets, whether double, so as to provide outlets on both sides of the wall, or single, in which only one outlet is provided. In the latter case a single section may be used, and the open rear thereof may be closed by a suitable plate. In any case, the conduit work involves simply the connection of one conduit to one box, instead of two boxes, as has been necessary heretofore. The wiring is also simplified in a similar manner.

While a number of different ways of using this invention has been illustrated and described, it is understood that many different combinations of the novel features thereof are useful, and this invention contemplates the use of such sub-combinations. It is further obvious that various changes may be made in the details of construction, within the scope of the appended claims, without departing from the spirit of this invention; it is, therefore, to be understood that this invention is not limited to the specific details shown and described.

Having thus described the invention, what is claimed is:

1. An outlet box, comprising, a pair of telescoping shells open at both ends and adjustable axially of one another, alignable and mutually registerable knock-out openings in said shells.

2. An outlet box, comprising, a pair of telescoping shells open at both ends and adjustable axially of one another, alignable knock-out openings in said shells, and means for securing said shells in adjusted relation to one another.

3. An outlet box, comprising, a pair of telescoping shells open at both ends and adjustable axially of one another, alignable knock-out openings in said shells, and means for attaching face plates to the open ends of said shells.

4. An outlet box, comprising, a pair of telescoping shells open at both ends and adjustable axially of one another, alignable knock-out openings in said shells, and means for mounting electric fittings in said shells.

5. An outlet box, comprising, a pair of telescoping shells open at both ends and adjustable axially of one another, alignable knock-out openings in said shells, means for mounting electric fittings in said shells, and means for attaching face plates to the open ends of said shells.

6. An outlet box, comprising, a pair of telescoping shells open at both ends and adjustable axially of one another, the outer of said shells being provided with a knock-out element, and the inner of said shells being provided with knock-out elements adapted for alinement with said element in said outer shell in any adjusted position of said shells.

7. An outlet box, comprising, a pair of telescoping shells open at both ends and adjustable axially of one another, means for securing said shells in adjusted position relatively to each other, the outer of said shells being provided with a knock-out element, and the inner of said shells being provided with knock-out elements adapted for alinement with said element in said outer shell in any adjusted position of said shells.

8. An outlet box, comprising, a pair of telescoping shells open at both ends and assembled to provide an axially extensible box, a bracket removably mounted within and intermediate the ends of said box, a supporting bar fixed in said bracket and extending to the end of said box, and a fastening element at the outer end of said bar.

9. An outlet box, comprising, a pair of telescoping shells open at both ends and assembled to provide an axially extensible box, a bracket removably mounted within and intermediate the ends of said box, and a supporting bar fixed in said bracket and extending to each end of said box.

10. An outlet box, comprising, a pair of telescoping shells open at both ends and assembled to provide an axially extensible box, a bracket removably mounted within and intermediate the ends of said box, and a screw threaded in said bracket and extending to each end of said box.

11. An outlet box, comprising, a pair of telescoping shells open at both ends and assembled to provide an axially extensible box, a bracket removably mounted within and intermediate the ends of said box, a supporting bar adjustably fixed in said bracket and extending to the end of said box, and a securing element on the end of said bar.

12. An outlet box, comprising, a pair of telescoping shells open at both ends and assembled to provide an axially extensible box, a bracket removably mounted within and intermediate the ends of said box, a supporting bar fixed in said bracket and extending to the end of said box, and a supporting element for said bar at the end of said box, and a fastening element at the outer end of said bar.

In testimony whereof I affix my signature this 14th day of January, 1928.

JAMES A. MORRELL.